W. C. McIntire.

Thread Cutter.

Nº 87,057.   Patented Feb. 16, 1869.

Witnesses
John D. Edmond
Wm Cameron

Inventor
Wm C McIntire

UNITED STATES PATENT OFFICE.

WILLIAM C. McINTIRE, OF WASHINGTON, DISTRICT OF COLUMBIA.

Letters Patent No. 87,057, dated February 16, 1869.

IMPROVEMENT IN THREAD-CUTTER AND SPOOL COMBINED.

The Schedule referred to in these Letters Patent and making part of the same.

*To all whom it may concern:*

Be it known that I, WILLIAM C. McINTIRE, of Washington city, in the District of Columbia, have invented a new and useful "Thread-Cutter;" and I do hereby declare the following to be a full and exact description thereof, reference being had to the accompanying drawings, making part of this application.

My invention has for its object to render unnecessary the practice of biting thread, which is at present indulged in by ladies and others, and to facilitate the work of sewing, by saving time; and consists in applying, to a spool of thread, a cutter, which I will explain fully, referring to the accompanying drawings, and in which—

Figure 1:
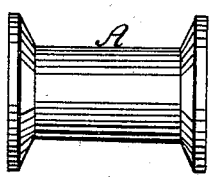
Figure 1 illustrates an ordinary empty spool.
Figure 2:
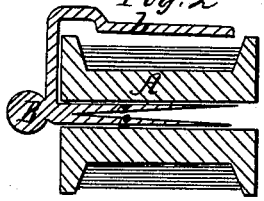
Figure 2 is a longitudinal vertical section of a spool with my device attached, the red lines representing the coils of thread.
Figure 3:
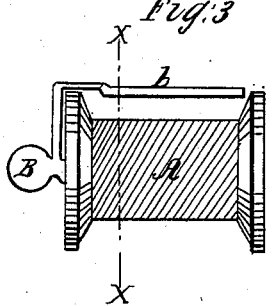
Figure 3 is a front view of the same.
Figure 5:
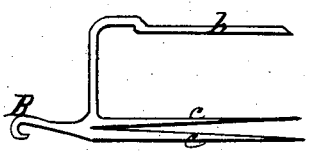
Figure 5, a detail view, showing my thread-cutter, adapted to be used as a ladies' glove-fastener, tweezers, or ripping-device.
Figure 4:
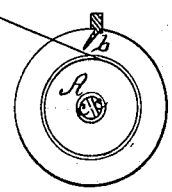
Figure 4 is a cross-section at the line $x\ x$ of fig. 3, showing the relative positions of the thread and cutting-edge.

It is well known that all who have occasion to use thread in sewing, in order to save time that would be required in taking up scissors to sever the cotton from the spool, invariably bite it with the teeth, and in doing so, subject them to sudden shocks, which are liable to injure or crack the enamel; and aside from this objection of biting the cotton, and injuring the teeth, it is frequently the case that the operative experiences inconvenience, and sometimes serious illness, from putting the mouth in contact with the poisonous drugs used in the preparation of the cotton.

It will be seen that by the employment of my thread-cutter, in combination with a spool, these evils are all overcome, and the thread severed without the loss of time which would be experienced in using any other cutting-device. The cutting-edge being set at an angle to the line of the thread when drawn out, will so cut the latter as to fray or disintegrate the fibres, which allows the cotton to be twisted up to a fine point, for insertion into the eye of the needle.

It will be observed that by alterations in the shape and design of my cutter, it may be adapted to use as a ripper for opening seams, a pair of tweezers, or a glove or gaiter-fastener.

To enable others to more fully understand the construction and operation of my improved thread-cutter, I will describe the same as shown in the accompanying drawings, similar letters of reference denoting like parts in the different figures.

A is the spool;

$b$, the cutting-edge, or knife;

B is the handle; and

C C, the spindle, in the form of a spring, with its edges smoothed or rounded, so as not to obstruct the free turning of the spool thereon; the object of the spring being to cause just sufficient friction to prevent the slipping off of the spool.

The frame or stock may be made in any shape that will conduct the cutting-edge over the coils of the thread, the cutting-edge being arranged at such angle as will best insure a perfect severing of the thread, as has been heretofore explained.

The size of the cutter, consituting no part of my invention, is left to discretion or the demand of the trade.

The operation is obvious, and will be readily understood, with but little explanation.

The spool is held by means of the handle-end B; the thread is then drawn out (the spool revolving upon the spindle C C) to the proper length, when it is raised slightly, and brought in contact with the cutting-edge $b$, when the thread is effectually severed.

As I have heretofore remarked, the cutter may be altered in design or size, without departing from the spirit of my invention.

Having described the construction, operation, and uses of my invention,

What I claim as new, and desire to secure by Letters Patent, is—

1. In combination with a spool, a thread-cutter, substantially as and for the purposes set forth.

2. A thread-cutter, so constructed as to be employed as a ripper, substantially as described.

3. A thread-cutter, so constructed as to be employed as a glove or gaiter-buttoner, substantially as described.

4. A thread-cutter, so constructed as to be employed as a pair of tweezers, substantially as described.

In testimony whereof, I have hereunto set my hand and affixed my seal, this 31st day of October, A. D. 1867.

WM. C. McINTIRE. [L. S.]

Witnesses:
JOHN S. HOLLINGSHEAD,
JOHN D. BLOOR.